Dec. 2, 1941.   R. J. WHITE   2,264,349
HANDLE FOR PAILS
Filed Nov. 12, 1938
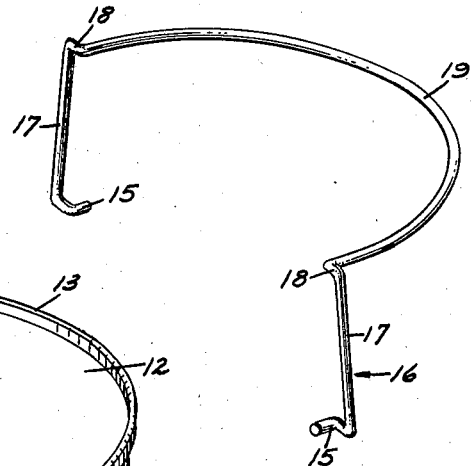
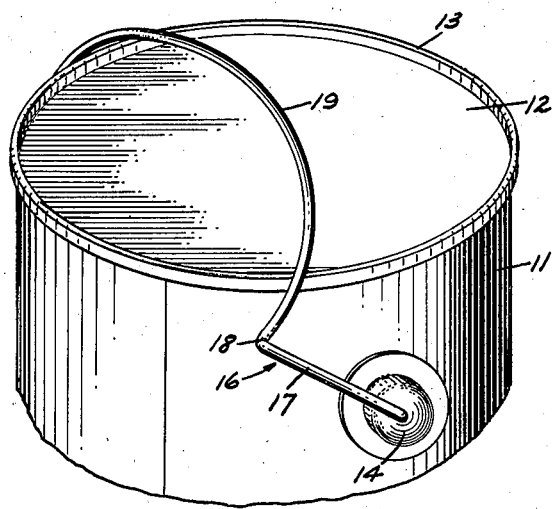
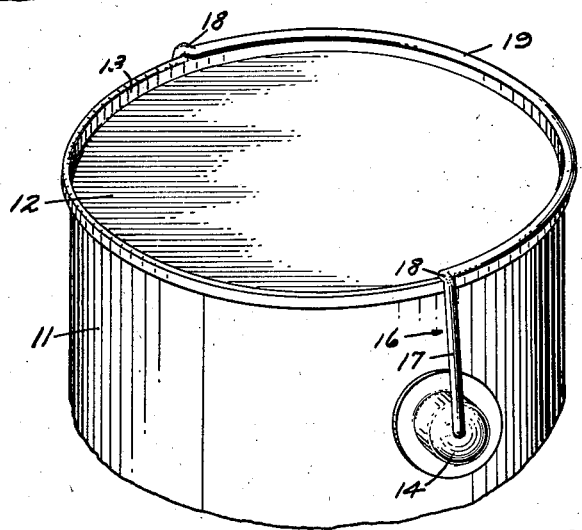
INVENTOR
Richard J. White
BY
ATTORNEYS Patented Dec. 2, 1941

2,264,349

UNITED STATES PATENT OFFICE 2,264,349

HANDLE FOR PAILS

Richard J. White, New York, N. Y., assignor to American Can Company, New York, N. Y., a corporation of New Jersey Application November 12, 1938, Serial No. 240,146

2 Claims. (Cl. 220—95)

The present invention relates to handles or bails for pails and the like with special adaptability for lithographed pails and has particular reference to an improved wire bail which when not in use as during shipment and storage lies flat against the pail where it is out of the way and where it does not contact with the sides of the pail so that marring of the lithographing thereon will be prevented.

An object of the invention is the provision of a wire bail of simple and cheap construction for a pail or the like wherein the bail is formed so that a portion thereof rests on top of the pail in such a manner as to be out of the way during shipment and storage of the pail and so that it will not hang down against the side of the pail when not in use thereby preventing marring or scratching of the sides of the pail particularly as where the sides are lithographed.

Another object is the provision of such a wire bail which will permit closer packing of pails on which it is used so that a plurality of such pails may be fitted into a smaller space than that required for the same number of pails having ordinary bails.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a wire bail embodying the instant invention;

Fig. 2 is a perspective view of the bail secured to a pail, the view showing only the upper part of the pail and also illustrating the bail in the position it occupies when in use for carrying the pail; and Fig. 3 is a view similar to Fig. 2 and illustrating the bail in the position it occupies when not in use.

As a preferred embodiment of the present invention the drawing illustrates a cylindrical sheet metal pail 11 of usual or preferred construction which includes a top member or end closure 12 secured thereto in any suitable manner, such as by an end seam 13. The body is provided with bail ears 14 which are disposed on diametrically opposite sides of the body adjacent the top thereof. These bail ears retain bent hook ends 15 of a one-piece wire bail 16.

The wire bail 16 is provided with legs 17 which at their free ends merge into the angularly disposed oppositely extending hook ends 15. The length of these legs is preferably equal to the distance that each bail ear is below the top edge of the end seam 13. The legs 17 opposite their free ends merge into short sections 18 which are bent inwardly at right angles and which are in alignment with each other on opposite sides of the bail.

The inner ends of the short sections 18 merge into a connecting horizontal curved hand engaging section 19 disposed substantially at right angles to both the parts 18 and to the vertical legs 17. This handle section 19 preferably conforms to the counter of the end seam 13 and is substantially equal to one half of its peripheral length.

Such a bail when in place on the pail and in non-carrying position as shown in Fig. 3, lies flat on top, the vertical legs 17 extending straight up adjacent the outside surface of the pail body and toward the end seam 13, the short sections 18 overlapping and resting upon the end seam, and the curved hand engaging section 19 conforming to the curvature of the end seam. In this position the bail is out of the way and flat against the pail top where it does not interfere with shipment or storage of the pail. Thus it facilitates packing a plurality of pails in a small space. The bail in this position cannot strike against the sides of the pail. In the case of a lithographed pail, such lithographing being almost universally on the side wall, marring of the lithographing by scratching is prevented.

When it is desired to use the bail for carrying the pail it is merely necessary to grasp the hand-engaging middle section and raise it into carrying position. This position is illustrated in Fig. 2. In this position the bent or angular form of the bail in no wise impairs the usefulness or strength of the bail for its carrying function.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A handle for sheet metal pails or the like, comprising a unitary wire bail including oppositely disposed substantially straight leg sections extending down adjacent the sides of the pail and terminating in portions pivotally connected with said pail, the intermediate portion of said bail comprising a curved section extending at an angle to and out of the plane of said leg sections and closely overlying and resting upon the top of said pail when the bail is in non-carrying position, said curved section substantially conforming to the contour of the top of said pail when in said non-carrying position and out of the way for shipment and storage and also spaced from the side of the pail so that marring thereof is prevented, said bail being adapted to be lifted into a position for convenient carrying purposes.

2. A handle for sheet metal pails or the like having an end seam and having bail ears, comprising a one-piece wire bail having oppositely disposed terminal hook sections for engaging in said bail ears to pivotally secure the bail to the pail, said bail having oppositely disposed substantially straight leg sections extending adjacent the sides of the pail from the ears to the end seam and merging into short leg sections disposed at an angle thereto, the short leg sections overlapping said end seam and being joined to an intermediate curved section extending substantially at right angles to and out of the plane of said leg sections and substantially conforming to the curvature of said end seam, said curved section being adapted to rest on said end seam when the bail is not in use thereby being out of the way for shipment and storage and away from the sides of the pail so that marring thereof is prevented, the said bail pivotally moving in conventional manner in said bail ears when the bail is brought into pail carrying position.

RICHARD J. WHITE.